(No Model.) 2 Sheets—Sheet 1.
J. H. IRWIN.
Domestic Oven for Lamp Stoves.
No. 230,635. Patented Aug. 3, 1880.
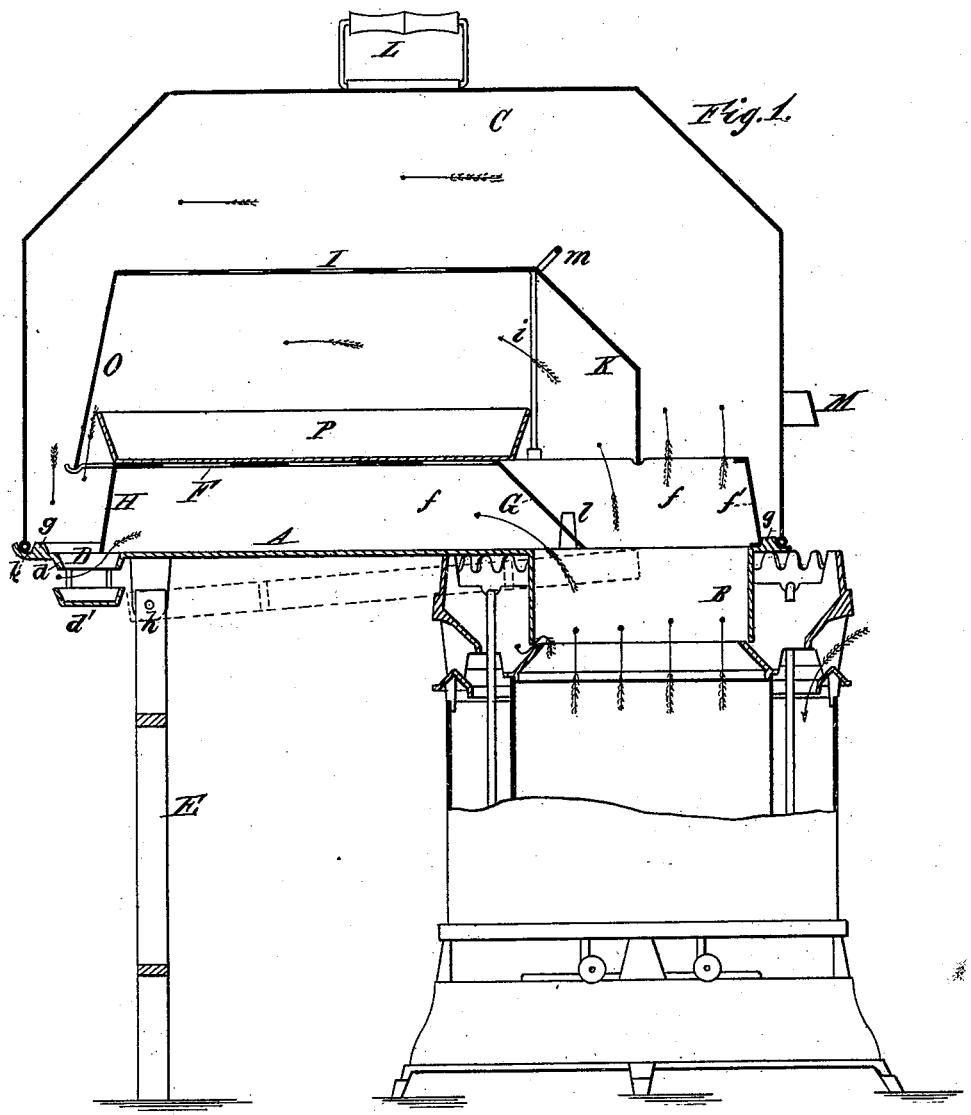
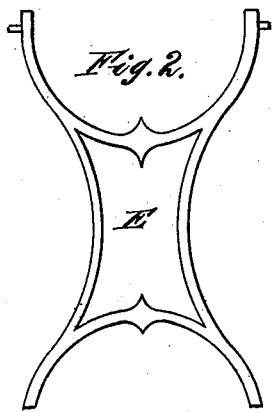

(No Model.) 2 Sheets—Sheet 2.
J. H. IRWIN.
Domestic Oven for Lamp Stoves.
No. 230,635. Patented Aug. 3, 1880.
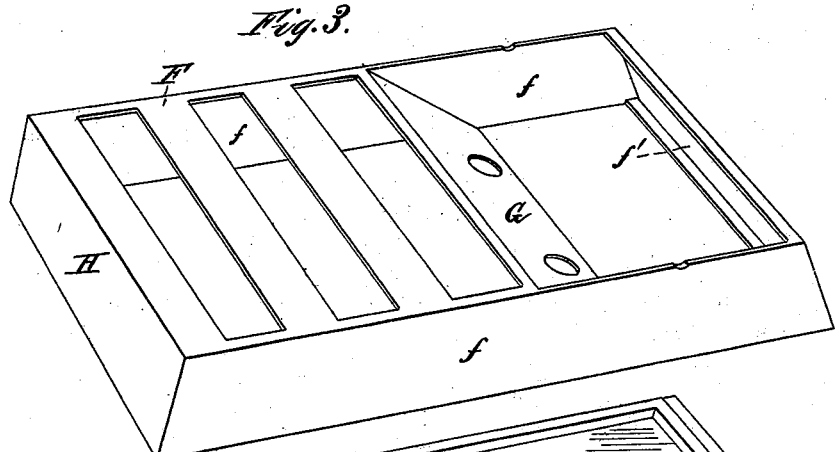
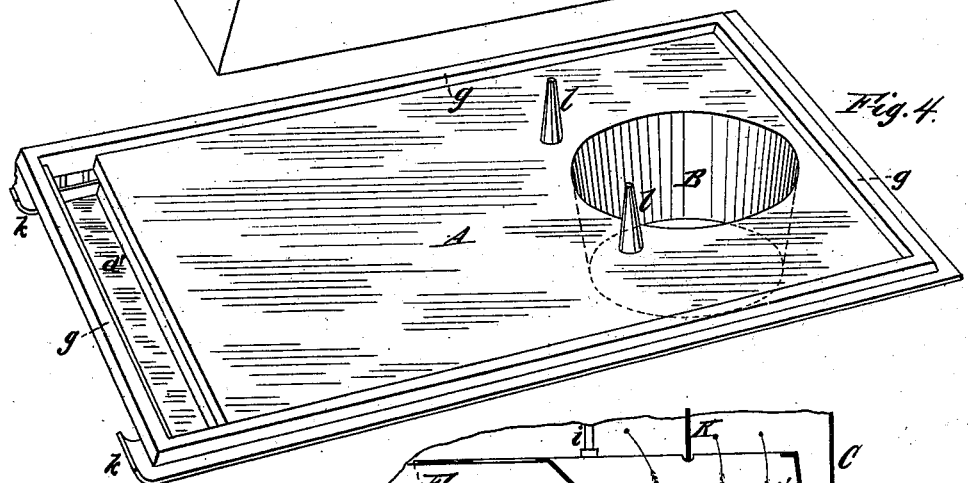
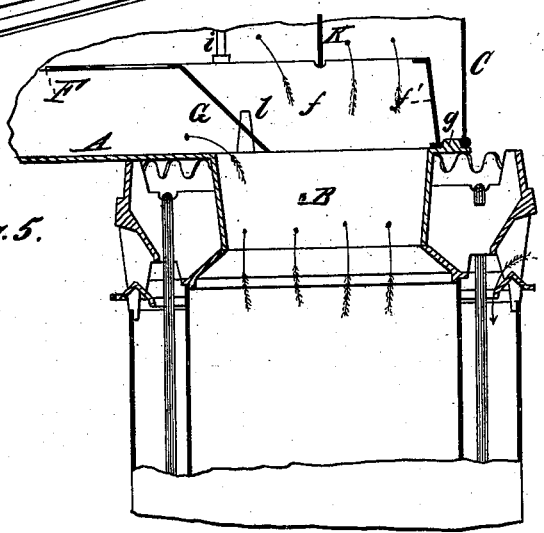
Attest:
Charles R. Searle,
Arthur M. Pierce.
J. H. Irwin,
Inventor:
By Worth Osgood,
Attorney.

UNITED STATES PATENT OFFICE.

JOHN H. IRWIN, OF MORTON, PENNSYLVANIA.

DOMESTIC OVEN FOR LAMP-STOVES.

SPECIFICATION forming part of Letters Patent No. 230,635, dated August 3, 1880.

Application filed May 6, 1880. (No model.)

*To all whom it may concern:*

Be it known that I, JOHN H. IRWIN, of Morton, in the county of Delaware and State of Pennsylvania, have invented certain new and useful Improvements in Domestic Ovens, of which the following is a full, clear, and exact description, reference being had to the accompanying drawings, and to the letters of reference marked thereon.

My invention has relation to that class of ovens which are specially adapted for use in connection with lamp-stoves, gas-stoves, gasoline-stoves, and the like, and through which the products of combustion are made to pass, the heat from which products accomplishes the desired baking or other work within the chamber before escaping at the outlet provided for them; and the objects of the improvements are, principally, to provide a base or bottom for the oven separable from the stove, which shall form a convenient extension or enlargement when the oven is removed, having a hinged supporting-leg at one end, and through which are the inlet and outlet openings; to combine with such bottom a close-walled removable oven, whereby superior circulating and heating capability is afforded; to provide suitable pan racks or supports and deflecting plates or surfaces within the oven for properly supporting the cooking-utensils and directing the heated currents over and under the same in a manner best adapted for the proper utilization of the heat therein, and to provide such an arrangement of parts as will enable one to employ the pan-racks in connection with the stove when the oven is removed.

To accomplish all of this the invention involves certain peculiarities of construction and relative arrangements or combinations of parts, all of which will be hereinafter first fully described, and then pointed out in the claims.

In the drawings, Figure 1 is a sectional view of my improved oven and connections, showing the same as mounted upon a lamp-stove and in position for use. Fig. 2 is an elevation of the supporting-leg detached from the oven-bottom. Fig. 3 is a perspective view of one of the pan-racks (the lower one) as it appears when separated from the other parts; and Fig. 4 is a similar view of the oven-bottom or extension-plate disconnected from the stove and oven and pan racks or trays. Fig. 5 is a sectional view of a fragment of the stove and superstructure, showing the connecting-collar as made conical and fitting the opening in the collar upon the stove-chimney.

Like letters of reference, wherever they occur, indicate corresponding parts in all the figures.

A is the oven-bottom, preferably made of cast metal. It is provided with a depending collar, B, made to conform to the opening in the upper part of the stove and to rest therein or upon some of the surrounding parts, supporting one end of the superstructure, and through this collar the products of combustion find their way into the baking-chamber when the oven C is located in its proper place, or through the same plate when the oven is removed. In Fig. 1 the collar B is shown as cylindrical and as resting at bottom upon the radial strips about the top of the stove, being slightly greater in diameter than the chimney-collar, so that some small quantity of the products of combustion may escape between the two before entering the baking-chamber; but as far as the present invention is concerned the collar B may be made conical in vertical section, as at Fig. 5, and thus adapted to fit closely in the open mouth of the chimney and to connect the chimney directly with the space above the bottom plate, A.

At the extremity opposite collar B is the outlet opening or discharge D, through which the products of combustion escape. This latter opening is made narrow and extends nearly the entire width of the oven, so that the products of combustion will be uniformly distributed through the baking-chamber. This outlet is surrounded by a narrow depending flange, $d$, to contribute strength to the adjacent parts (the plate A being made as light as is consistent with the required strength and durability) as well as to serve to deflect impinging air-currents so as to cause an exhaustion from the chamber above the plate, compelling an increased blast of heat upon the cooking-utensils and the material contained within the oven rather than to retard the outflow or to permit the inflowing of cold air at this point.

Under all ordinary circumstances the flange $d$ will operate as an ejector, as above explained; but in some cases it may be advantageous to suspend the dish-shaped vessel d', or some equivalent therefor, below the opening D, which, when in place, will prevent any upturned currents from entering the opening D. A flat plate would answer in this position, or any obstruction which would guard the entire opening.

At E is shown a supporting-leg hinged to the oven-bottom, as at h, and this, when turned down, serves to maintain the free end of the plate and whatever may be placed upon it. For convenience in packing or in storing the bottom plate, A, when detached from the stove, this leg may be folded up against the under side of the plate, the lower portions reaching around the collar B, where they are out of the way, as indicated by the dotted lines, Fig. 1. For the support of the baking-pans or other utensils I provide one or more racks or trays, which may be covered by the oven C. I have shown two of these trays, one above the other, and separable from each other, so that one alone may be used if desired; but a greater number may be adopted if found convenient. The lower tray, F, is supported within the flange or rim g, surrounding the plate A upon the side plates, f f, and end plate, f', and with this tray are connected the two deflecting-plates G H, the plate G being long enough to reach across the inlet-opening and inclined at about an angle of forty-five degrees, and located over the inlet at about the position shown, while the plate H is nearly vertical, and located about as indicated. This latter plate also assists in supporting the tray and its contents.

Upon this tray is supported a second tray, I, with suitable legs i, bearing upon tray F, and having a deflecting-plate, K, attached and reaching over to about the middle line of the inlet-opening.

When assembled as in Fig. 1 the operation of these devices is as follows: A part of the incoming currents is deflected by plate G under tray F and under the pan P or other utensil placed thereon. Another part is deflected by K, so as to pass over the articles on F and under those on I, while still another portion is directed toward the top of the oven and over the utensils on I. As before intimated, the tray I, with its attachments, may be detached or removed and F alone employed, and the bottom A may be used without the trays.

When the air-tight casing C is removed the tray F may still be employed in connection with the stove, the part over the inlet serving to support any utensil which it may be desired to heat, and the other part to maintain other vessels under which the products of combustion will be deflected as before. In this use of the device, which will be found advantageous, especially in keeping articles warm, as in a warming-closet, the side and end plates and deflector H prevent cold-air currents from blowing across the top of plate A and beneath the articles on the tray.

The trays may be made in the form of openwork racks, to be covered by a pan, P, of about the same extent of surface as the tray, or they may be made of metal not perforated, or they might have a pot or pan hole, with the usual cover or lid therefor, as in a common stove-top, it being only necessary that they support the cooking-utensils, as desired.

The lower tray is held in proper place by the studs l l, and the upper tray by its supporting-legs i, so that there will be no danger of disarranging the parts when the contents of the oven are being inspected.

The stops m serve to prevent the pans, &c., from being pushed too far over the inlet-opening.

The oven C is made close-walled, and fits down accurately around rim g, so as to closely confine its contents, and it is provided with two handles, one—L, at top, for removing the oven bodily from over the plate A, and the other, as at M, for convenience in tipping up the oven for inspection of its contents, so that it will not become cooled too much by admission of cold air.

To facilitate the tipping of the oven, one end or side thereof is made to rest upon slightly-upturned projections k k, which prevent the oven from being accidentally displaced. These form a kind of hinge for the oven, and they might be replaced by any suitable form of hinge, which should preferably be made so that the oven may be completely dismounted or removed from over the base and trays whenever desired to employ the plate A without the oven or without either of the trays.

The plate A forms a convenient extension to the stove-top, which may be utilized as any other extension. It may be readily detached from the stove, or readily located in proper position in connection therewith.

The oven is shown as angular in section, the upper corners being inclined, though the corners may be curved, or the whole oven continuously curved from one end to the other. Either of these constructions affords a more perfect deflection of the heated currents upon the articles to be baked, and renders the flow of the currents through the oven more uniform than could result from the employment of a simple square oven, such as is most commonly employed.

It will be observed that the deflecting-plate G extends to about the quarter line of the inlet-opening, and that plate K is located about over the middle line, these positions being found to afford the best results in practice, though they may be slightly varied without materially affecting the operation of the oven; so, also, with respect to plates H and O, which are located over the third and middle lines, respectively, of the outlet opening.

Whenever the oven is removed entirely, or tipped back for inspection of its contents, the trays or racks and the vessels or objects thereon remain in proper place upon the plate A. In previous forms of oven for these portable stoves, &c., the trays are made to be removed with the oven, necessitating the employment of a door upon the oven. This door as usually made permits an outlet of heated air or an inlet of fresh air, either of which detracts from the heating capacity of the oven, which is one of the disadvantages intended to be overcome by my improvements.

The stove shown in the drawings is of the same character as those heretofore shown by me in Letters Patent No. 226,520, of April 15, 1880, in applications for patents filed February 14, 1880, April 15, 1880, and April 16, 1880—that is, of such construction that any wind striking the stove will cause an increased inflow of fresh air to feed the flames, and consequently an increased combustion, and such as will prevent any retardation of combustion by any exterior atmospheric disturbances or movements of the structure. It is with this class of stoves that my present improvements operate to best advantage.

It will be observed that any air-currents which can strike the stove or the oven will cause an increased combustion, either by injection of fresh air at the air-feeding conduits leading to the burners or by exhaustion of the products of combustion through the outer opening, or by both together. Either of these operations will increase the velocity of the currents which strike the material to be cooked, and repeated experiments have demonstrated that the greater the velocity of these currents and the greater their force against the material operated upon (their heat remaining the same) the greater will be their cooking or heating effect. Since the oven is connected with the stove-chimney, and that with the fresh-air conduits upon which the injectors are located, it is plain that there will be an injection of heated currents at one end of the oven through the inlet-opening, and an ejection at the discharge-opening.

The apparatus thus assembled and operating is well calculated to produce the best cooking results and to utilize all the heating qualities of the stove to the best advantage.

Having now fully described my invention, what I claim as new herein, and desire to secure by Letters Patent, is—

1. The herein-described extension-plate, provided with an inlet-opening for the products of combustion and an outlet-opening at the opposite extremity for the same, said plate forming the oven-bottom, supporting the removable oven and the removable trays, and having the openings therein arranged substantially as described, so that the products of combustion are compelled to take a downward course before leaving the oven, substantially as shown and set forth.

2. In combination with the bottom plate having inlet and outlet openings therethrough for admission and escape of products of combustion, and forming, when in place, an extension of the stove-top, the removable close-walled oven covering said bottom plate, substantially as shown and described.

3. In combination with the removable oven-bottom having outlet and inlet openings therethrough, and adapted to support the detachable oven in the manner explained, the hinged leg connected with said bottom and adapted to be folded up against the same, in the manner and for the purposes stated.

4. In combination with the oven-bottom, a rack for cooking-utensils mounted thereon, and provided with deflecting-plates extending across the openings in said bottom, substantially as and for the purposes set forth.

5. The combination, with the oven-bottom having perforations therethrough for the inlet and outlet of products of combustion, of the removable pan-racks mounted upon said bottom, and the close-walled oven made detachable from the bottom, substantially as described, so as to leave the racks in place, substantially as shown and explained.

6. In combination with a stove having air-injecting surfaces, in connection with the feed-air inlets, an oven-bottom located over the stove-chimney and provided with an opening communicating directly with said chimney, said bottom having also an outlet-opening through it, which latter is provided with an ejector or ejector-surfaces, substantially as explained, so that exterior air-currents will cause an increased velocity of currents through the two openings in the bottom plate, for the objects named.

7. In combination with the outlet-opening through the bottom plate of the oven, which plate is also perforated for the admission of products of combustion to the oven, the ejector or deflecting surfaces arranged in connection therewith and adapted to deflect impinging air-currents, substantially in the manner and for the purpose set forth.

8. In combination with a close-walled removable oven, a bottom plate provided with an inlet-opening at one end for the admission of products of combustion to the oven and an outlet at the other extremity, through which the products are compelled to escape after traversing the oven, the outlet being made long and narrow, and extending nearly the entire width of the oven, substantially as and for the purposes set forth.

In testimony that I claim the foregoing I have hereunto set my hand in the presence of two witnesses.

J. H. IRWIN.

Witnesses:
WORTH OSGOOD,
ARTHUR M. PIERCE.